Dec. 6, 1927.

A. J. GRANBERG

FLUID METER

Filed Jan. 19, 1926  2 Sheets-Sheet 1

1,651,885

INVENTOR.
ALBERT J. GRANBERG
BY
ATTORNEYS.

Dec. 6, 1927.

A. J. GRANBERG

FLUID METER

Filed Jan. 19, 1926

INVENTOR.
ALBERT J. GRANBERG

BY
Dewey, Strong, Townsend & Loftus
ATTORNEYS.

Patented Dec. 6, 1927.

1,651,885

UNITED STATES PATENT OFFICE.

ALBERT J. GRANBERG, OF BERKELEY, CALIFORNIA.

FLUID METER.

Application filed January 19, 1926. Serial No. 82,222.

This invention relates to liquid meters for accurately measuring and indicating the volume of fluids.

It is the principal object of the present invention to generally improve the construction and operation of fluid meters whereby to provide a meter of comparatively simple construction which is capable of accurately registering the volume of liquid passing therethrough and wherein the wearing surfaces of the operating parts will not be exposed to the abrasive action of any gritty substances likely to be contained in the liquid being metered.

In carrying out this object I provide a meter having a metering chamber divided into a plurality of compartments by cooperating pistons. Above the metering chamber an inlet chamber is provided and below the metering chamber a discharge chamber is formed. Valve means are provided which cooperate with the pistons to control the admittance of fluid from the inlet chamber to the metering compartments and from the latter to the discharge chamber. The pistons are actuated by the fluid and in turn actuate the valves so that the fluid is delivered to the metering compartments in succession and expelled from opposite compartments. The displacement of the pistons is indicated by a registering mechanism to indicate the quantity of liquid passing through the meter.

One form which the invention may assume is exemplified in the following description and illustrated by way of example in the accompanying drawings, in which.

Referring more particularly to the accompanying drawings, 10 indicates a fluid meter capable of accurately registering the quantity of fluid or liquid passing through it. This meter 10 is fitted at its top with a registering mechanism 11 for visibly indicating the volume of fluid passing through the meter. Registering or indicating mechanisms of this type are well known and for this reason it is not illustrated or described in detail. It will suffice to say that the indicator is driven by the meter mechanism to translate the cubic volume of liquid passing through the meter into gallons and portions thereof, when using the meter in connection with liquid dispensing apparatuses and the like. However, the indicator may indicate the quantity of liquid or fluid passing through the meter in any other desired manner without departing from the present invention.

Figure 1:
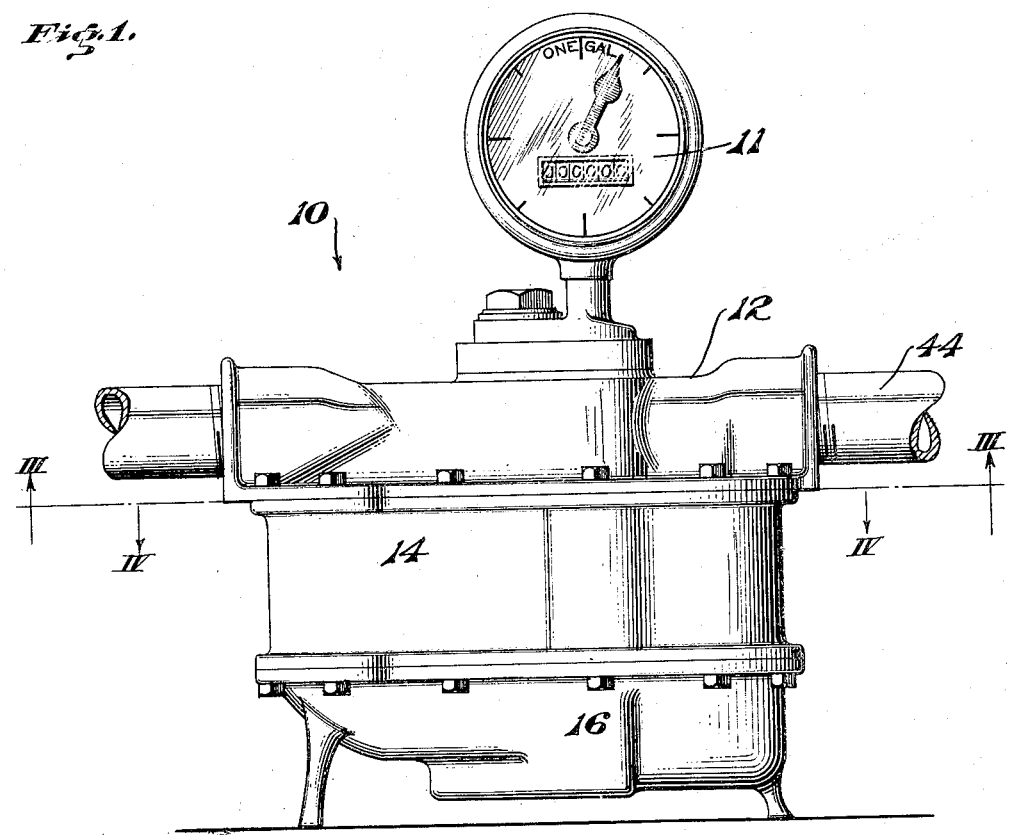
Fig. 1 is a side elevation of a meter embodying the preferred form of my invention.
Figure 2:
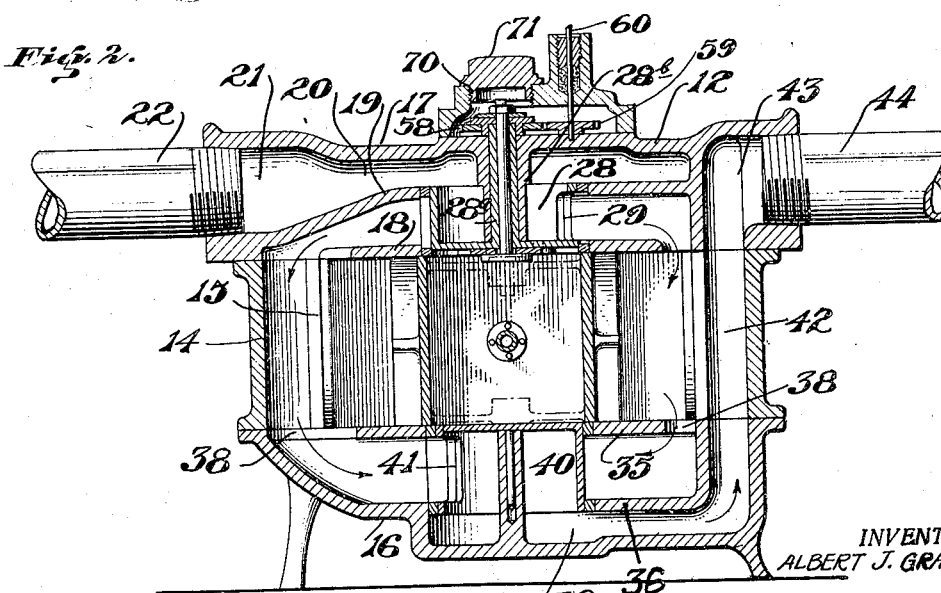
Fig. 2 is a vertical central section through the meter disclosing its construction and taken on line II—II of Fig. 3.

Reference being had to Figs. 1 and 2, the meter comprises a meter head 12, a body 14 forming a metering chamber 15, and a base 16. The members are arranged in superposed position and are firmly bolted together at their meeting surfaces as illustrated in Fig. 1.

The meter head 12 is formed with upper and lower walls 17 and 18 which are spaced apart. Intermediate these walls is a central wall 19 dividing the interior of the head into two horizontal chambers. The upper chamber 20 of the head is the inlet chamber which is formed with an inlet port 21 which may be connected with a pipe 22 connecting the meter with the source of fluid or liquid to be metered. The lower chamber in the head 12 is divided by radially arranged walls 23 extending between the central wall 19 and the lower wall 18 into four compartments 24, 25, 26 and 27.

Centrally located in the lower chamber of the head 12 is a vertically disposed sleeve inlet valve 28 which is rotatably supported at its ends in the central and lower walls 19 and 18. The upper end of this inlet valve is open so that it will be in constant communication with the inlet chamber 20 in the head 12. Its lower end is closed so as to prevent liquid from passing directly from the inlet chamber 20 to the metering chamber 15.

The inlet valve acts to control communication between the inlet chamber 20 and the compartments 24 to 27. For this reason it is formed with a port 29 of area substantially equal to the area of the inner end of any one of the compartments 24 to 27. Therefore, by revolving the inlet valve the compartments will be successively placed in communication with the inlet chamber 20.

So that liquid or fluid entering the compartments 24 to 27 may pass into the metering chamber, each compartment 24, 25, 26 and 27 is formed with a port 30. These ports 30 are formed in the lower wall 18 of the head adjacent its outer periphery. It is therefore manifest that liquid delivered to the metering head through the inlet chamber 20 will pass through the inlet valve and distribute itself to the various compartments in succession from whence it will pass into the metering chamber 15 to be metered.

The metering chamber 15 communicates with four discharge compartments 31, 32, 33 and 34 formed between the upper and lower walls 35 and 36 of the base 16. These compartments are in vertical alignment with the compartments 24 to 27 in the head and are separated from each other by radially arranged walls 37 extending between the upper and lower walls 35 and 36 of the base. The discharge compartments 31, 32, 33 and 34 are formed with ports 38 whereby they will be in communication with the metering chamber 15. These ports 38 are formed in the upper wall 35 of the base 16 in vertical alignment with the ports 30 of the inlet compartments 24 to 27.

The base 16 is formed with a discharge chamber 39 which is separated from the metering chamber 15 and discharge compartments 31 to 34 by a sleeve discharge valve 40. This discharge valve 40 is vertically arranged in axial alignment with the inlet valve 28 and is journalled for rotation at its ends in the upper and lower walls 35 and 36 of the base 16. The outlet valve is formed at its side with a port 41 which successively forms a communication between the discharge compartments 31 to 34 and the discharge chamber 39. The latter communicates with a vertical passageway 42 extending through the body 14 and head 12 and terminates at the latter in a discharge port 43. This port 43 may be connected to a discharge pipe 44.

It should be stated that the valves 28 and 40 are operated in synchronism and that their ports are arranged in diametrically opposed positions. The valves 28 and 40 are revolved by a gyratory slide 45 horizontally arranged in the metering chamber 15 and slidably disposed between the lower wall 18 of the head 12 and the upper wall 35 of the base. This slide comprises spaced pistons 46 which extend vertically between the adjacent walls of the head 12 and base 16 and are rigidly connected by upper and lower webs 47 and 48 which are arranged horizontally.

Figure 6:
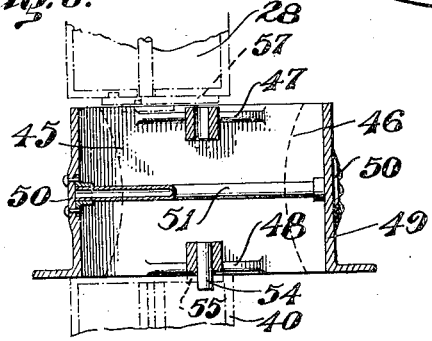
Fig. 6 is a view in central section through the gyratory piston and disclosing the mechanism connected thereto in dotted lines and taken on line VI—VI of Fig. 4.

The gyratory slide 45 is reciprocably mounted in a reciprocable slide 49 which is reciprocably mounted for reciprocation in a horizontal plane within the metering chamber 15. This reciprocable slide 49 is formed with spaced parallel pistons 50 which are rigidly connected by a bar 51 as disclosed in Figs. 4 and 6. The pistons 50 extend vertically between adjacent walls of the head 12 and base 16 and horizontally between parallel guide surfaces 52 at opposite sides of the metering chamber 15. The adjacent inner faces of the pistons 50 are formed with guide surfaces 53 between which the pistons 46 of the gyratory slide 45 extend and are slidable.

It is obvious that when the gyratory slide 45 gyrates about the vertical axis of the metering chamber (in alignment with which axis the valves 28 and 40 are arranged) that it will reciprocate within the reciprocal slide 49 and will simultaneously reciprocate the latter. It is likewise apparent that in certain positions, pressure applied to actuate the reciprocable slide 49 will aid the slide 45 in its gyratory movement.

The pistons of the slides in reality divide the metering chamber 15 into four metering compartments 31$^a$, 32$^a$, 33$^a$ and 34$^a$. These compartments correspond with the intake and discharge compartments in the head and base respectively.

Figure 3:
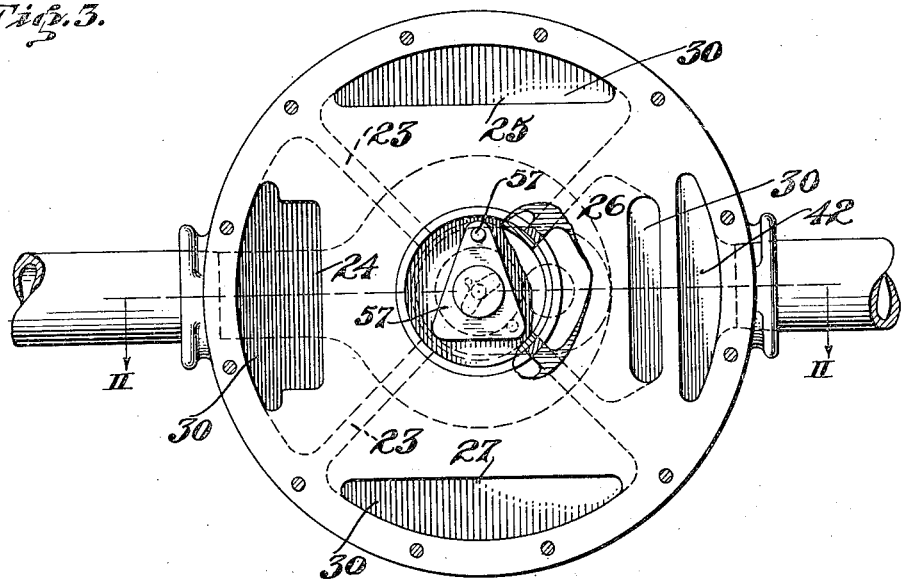
Fig. 3 is a section through the meter taken on line III—III of Fig. 1, disclosing the bottom of the meter head with parts broken away to more clearly illustrate certain features of its construction.

It is intended that the fluid entering the metering chamber be the means for gyrating the slide 45. For example, referring to Figs. 3 and 4, when the port 29 of the inlet valve 28 registers with the compartment 26, the port 41 of the discharge valve 40 will register with the discharge compartment 31. Therefore, the fluid entering the meter will enter the metering compartment 33$^a$ and bear against the adjacent piston 46 of slide 45 and move the same laterally. This lateral movement will cause the opposite piston 46 to expel the liquid from the opposite compartment 31$^a$ through the discharge compartment 31 into the discharge chamber 39 and from the meter.

In order that the slide 45 will gyrate and operate the valves 28 and 40 in synchronism it is eccentrically connected with both valves. That is the lower web 48 of the slide 45 is fitted with a pin 54 which extends downwardly and engages a slot 55 formed in the discharge valve top in a position relatively eccentric to the axis about which the valve 40 revolves. Likewise the top web 47 engages a crank pin 56 carried by an adjusting plate 57 normally relatively fixed on the bottom of the inlet valve in a position where the crank pin 56 will be arranged relatively eccentric to the axis about which the valve revolves. It is therefore manifest that reciprocable motion of the slide 45 will be converted into gyratory motion and will impart rotary movement to the valves 28 and 40.

The relative positions and the movement of the valves is such that the fluid will exert a pressure on the pistons of the slides in succession and keep them in constant motion.

The movement of the slides is limited by their connection with the valves and therefore the cubic area which they displace is translated into gallons by the registering mechanism 11. To accomplish this the sleeve 28ª of the inlet valve extends upwardly through a boss 28ᵇ in the head 12 and is fitted with a fixed gear 58. This gear meshes with a pinion 59 fixed on the drive shaft 60 of the registering mechanism. The ratio between these gears is such that each time the pistons displace a cubic area equal to a gallon, one gallon is registered by the registering mechanism. In the drawings, the indicator is shown as indicating portions of one gallon and multiples of one gallon.

In order to adjust the device to render it exactly accurate, I provide means for adjusting the stroke of the pistons by changing the distance between the axis of the inlet valve and the crank pin 56. As before stated this crank pin is fixed on a plate 57 which is normally stationarily held on the bottom of the inlet valve 28.

Figure 5:
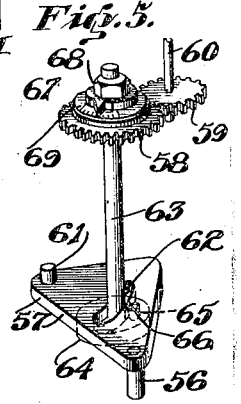
Fig. 5 is a perspective view disclosing the adjustment mechanism.

Reference being had to Fig. 5 wherein this structure is most clearly illustrated it is seen that the plate 57 is formed with an upwardly projecting pin 61 which engages an eccentrically positioned hole in the bottom of the inlet valve 28. Intermediate the pin 61 and the crank pin 56, the plate 57 is formed with an arcuate slot 62 struck from the center of the pin 61. This slot is located off center relative to the pins 61 and 56 as disclosed.

Projecting upwardly through the slot and through the valve stem of the valve 28 is an adjusting pin 63. The lower end of this pin is formed with a head 64, the upper surface of which bears against the under surface of the adjustment plate 57. The head 64 of the adjusting pin 63 is formed with an upwardly projecting eccentrically positioned pin 65 which engages a notch 66 formed at the center and forward edge of the arcuate slot 62. It is obvious therefore that when the pin 63 is turned, the pin 65 will cause the adjustment plate to slightly pivot about the pin 61 and change the distance from the center of the adjustment pin 63 to the center of the crank pin 56. As the adjusting pin 63 is located on the axial center of the inlet valve 28 it is seen that by turning the pin that the distance from the center of the valve to the center of the crank pin will either be lengthened or shortened, and will change the stroke of the crank pin 56. This correspondingly changes the stroke of the slides in the metering chamber and allows for a greater or less cubic displacement of the pistons and changes the amount which the indicating mechanism 11 will register for each cycle of operation of the slides.

In order to turn the adjusting pin 63, its upper end is fitted with a pointer 67 which is clamped to the pin by a nut 68. The pointer 67 cooperates with a dial 69 which is fixed on the gear 58. Access may be had to the pointer 67 through an opening 70 in the head 12 which is normally maintained closed by a cap 71. By removing the cap 71 access may be had to the pointer 67. By turning the pointer the adjusting pin 63 will be rotated and in turn, as described, will alter the stroke of the crank pin 56. This will effect the stroke of the slides so that the displacement of the latter may be accurately indicated by the indicating mechanism 11.

In operation of the device, assuming that fluid is delivered to the pipe 22 by a pump or by gravity and that the inlet and discharge valves 28 and 40 are in the positions disclosed in the drawings, the fluid delivered through the intake port 21 will discharge through the port 29 in the valve 28 into the inlet compartment 26. From this compartment the fluid will discharge downwardly through the port 30 into the metering compartment 33ª where it will act against the adjacent piston of the gyratory slide 45. The pressure of the fluid will act to move the gyratory slide toward the opposite metering chamber. The opposite piston of the gyratory slide will act to displace the liquid in this latter compartment and will force it downwardly through the discharge compartment 31 in the base and thence through the port 41 in the discharge valve 40 into the discharge chamber 39. From the discharge chamber it will pass upwardly through the passageway 42 into the discharge pipe 44.

It is manifest from the foregoing description that as the slide is moved to displace the liquid in the compartment 31ª of the metering chamber, that due to its eccentric connection with the inlet valve 28, the gyratory slide will gyrate about the vertical axis or center of the metering chamber. Therefore as it moves toward the compartment 31ª it will also move the slide 49 in a direction tending to displace the liquid in the compartment 32ª of the metering chamber.

It is seen that as soon as the crank pin 56 passes over the center that the port 29 in the inlet valve will commence to close the intake compartment 26 and start to open the intake compartment 27. Likewise the port 41 in the discharge valve 40 will commence to close the discharge compartment 31 and commence to open the discharge compartment 32. Therefore, as soon as the port 29 in the inlet valve commences to register with the compartment 27 fluid will pass from the inlet chamber into the metering compartment 34ª and exert a pressure against the adjacent piston of the reciprocable slide 49. This pressure will aid in gyrating the gyratory slide 45.

It is seen that while fluid is being admitted from the inlet chamber 20 to the metering compartment 34ª, the port 41 in the discharge valve 40 has commenced to register with the discharge compartment 32, and permits liquid to be expelled from this compartment into the discharge chamber 39.

Figure 4:
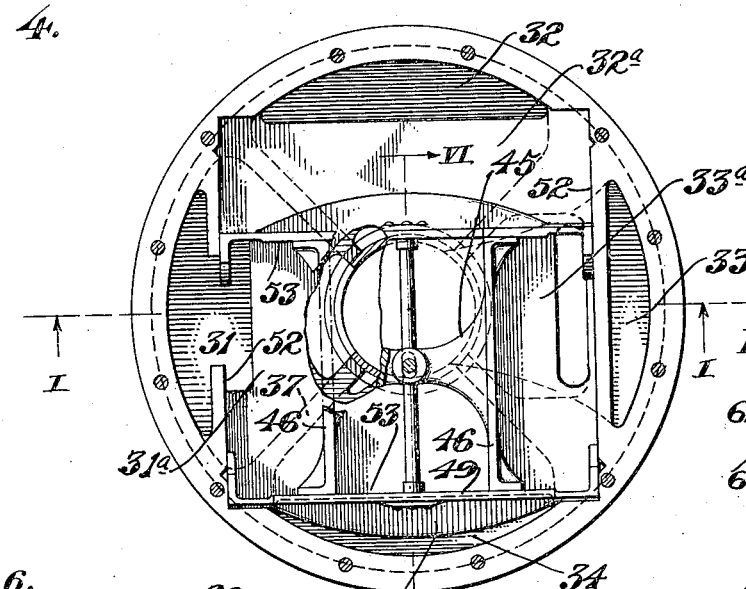
Fig. 4 is a section through the meter taken on line IV—IV of Fig. 1.

Reference being had to Fig. 4 when the crank pin 56 is moved one-quarter of its cycle of operation, the port 29 in the valve 28 will be out of register with the intake compartment 26 and in full register with the intake compartment 27. Likewise the port 41 in the discharge valve 40 will be out of register with the discharge compartment 31 and in full register with the discharge compartment 32. Therefore, the pressure of the fluid against the piston in the metering compartment 34ª will move the crank pin 56 over center and the inlet port 29 will commence to register with the intake chamber 24 and the discharge port 41 will commence to register with the discharge compartment 32. Therefore, fluid pressure will be exerted on the piston of the reciprocable slide within the metering compartment 34ª and also within the metering compartment 31ª against the piston of the gyratory slide 45.

Due to the position of the port 41, the discharge compartments 32 and 33 will be placed in communication with the discharge chamber 39 so that the displacement of the pistons in the metering compartments 32ª and 33ª will cause the liquid to be expelled from the meter.

It is obvious from the foregoing that the inlet and discharge valves will be synchronously operated in order that the fluid will successively enter the compartments of the metering chamber and exert a pressure against the pistons in rotation, and that these pistons will act to successively expel the fluid from the chambers which are diametrically opposed to those in which the fluid is admitted.

As described, the pressure of the fluid acting in this manner causes the slide 45 to gyrate and operate the valves. This rotary movement of the valves drives the registering mechanism 11 which records in gallons the amount of liquid discharged from the meter.

One of the principal features of the present meter is that the bearing surfaces between the pistons and the adjacent walls of the head and base between which they operate will not be subjected to the abrasive action of gritty substances contained in the liquid being metered. This is for the reason that a clear vertical passageway is provided between the ports forming communications between the intake and discharge compartments. The heavier particles will pass directly from the ports 30 in the bottom wall of the head directly down through the metering compartments, through the ports 38 into the discharge compartments. From the discharge compartments they may pass through the port 41 in the valve 40 into the discharge chamber 39.

Should any grit or abrasive substance deposit upon the upper wall of the base on which the pistons operate, the pistons will scrape the gritty substance from the bearing surface in their movement toward the ports 38 and discharge the substance into the ports 38.

It is therefore apparent that any gritty substance in the fluid will not have the opportunity of getting between the bearing surfaces of the pistons and adjacent walls of the head and base to cause rapid wear of the parts. Such wear would quickly result in inaccurate metering and faulty operation of the device.

While I have shown the preferred form of my invention, it is to be understood that various changes in its construction may be made by those skilled in the art without departing from the spirit of the invention, as defined in the appended claims.

Having thus described my invention, what I claim and desire to secure by Letters Patent is:

1. A fluid meter comprising a casing having inlet and discharge openings and a metering chamber therein, metering means in the metering chamber adapted to be actuated by fluid admitted to the metering chamber, said means including a gyratory piston, a rotatable inlet valve disposed at one end of the metering chamber, a rotatable discharge valve disposed at the other end of the metering chamber, connecting means between the gyratory piston and said valves whereby gyration of said piston will operate the valves in synchronism therewith, a registering mechanism and means connecting said registering mechanism to the piston whereby movement of said piston will operate the registering mechanism.

2. A fluid meter comprising a casing having an inlet port at its upper end and a discharge port at its lower end, a metering chamber formed intermediate said ports, metering means within said metering chamber and adapted to be actuated by fluid admitted to the chamber, said metering means including pistons dividing said metering chamber into four compartments, a rotatable inlet valve disposed above the metering chamber and controlling the passage of fluid from the inlet port to said metering compartments, a rotatable discharge valve disposed below the metering chamber to control the discharge of fluid from said metering compartments to said discharge port, means forming an operative connection between said pistons and said valves whereby they will be operated in synchronism to successively admit fluid to said metering compartments and to permit the discharge of fluid therefrom, and registering means operated by said pistons to register the volume of fluid passing through said meter.

3. A fluid meter comprising a casing formed of a meter head, a base, and a body portion disposed intermediate the head and base, a metering chamber formed in said body portion, metering means disposed within said chamber and adapted to be actuated by fluid admitted thereto, said metering means including a reciprocable slide and a gyratory slide, said slides dividing the metering chamber into four compartments, there being an intake port in the head, a rotatable inlet valve in the head controlling the admittance of fluid from the intake port to said metering compartments, a rotatable discharge valve in the base controlling the discharge of fluid from the metering compartments, there being a discharge port in the base in communication with said valve, a connection between said gyratory slide and said valves whereby gyration of said slide will rotate said valves to successively admit fluid to said metering compartments and to permit it to discharge therefrom, and registering means operatively connected to said gyratory slide.

4. A fluid meter comprising a casing formed of a meter head, a base, and a body portion disposed intermediate the head and base, a metering chamber formed in said body portion, metering means disposed within said chamber and adapted to be actuated by fluid admitted thereto, said metering means including a reciprocable slide and a gyratory slide, said slides dividing the metering chamber into four compartments, an intake port in the head, a rotatable inlet valve in the head controlling the admittance of fluid from the intake port to said metering compartments, a rotatable discharge valve in the base controlling the discharge of fluid from the metering compartments, a discharge port in the base in communication with said valve, a connection between said gyratory slide and said valves whereby gyration of said slide will rotate said valves to successively admit fluid to said metering compartments and to permit it to discharge therefrom, and registering means operatively connected to said gyratory slide, and means for varying the stroke of said gyratory slide.

5. A fluid meter comprising a casing having inlet and outlet openings and a metering chamber formed therein, metering means disposed within said metering chamber and adapted to be actuated by fluid admitted thereto, an inlet compartment above the metering chamber, a wall separating the inlet compartment from the metering chamber, a discharge compartment below the chamber, a wall separating the discharge compartment from the metering chamber, said walls having ports formed therein whereby to place said inlet and discharge compartments in constant communication with the metering chamber, a valve controlling the admittance of fluid to the inlet compartment from the inlet opening, a valve controlling the discharge of fluid from the discharge compartment to the discharge opening, an operative connection between the metering means and said valves whereby the latter will operate synchronously with the metering means, and a registering mechanism operated by said metering means.

6. A fluid meter comprising a casing having inlet and discharge openings and a metering chamber formed therein, metering means disposed within said chamber dividing said chamber into four compartments, said metering means being actuated by fluid admitted successively to said compartments, an inlet compartment above each metering compartment, a discharge compartment below each metering compartment, said inlet and discharge compartments being in constant communication with the metering compartments, a rotary valve adapted to successively admit fluid to said inlet compartments from the inlet opening, a rotary valve adapted to permit the discharge of fluid from said discharge compartments to said discharge opening in succession, means forming an operative connection between the metering means and said valves whereby they will operate in synchronism with the metering means, and a registering mechanism operated by said metering means.

7. A fluid meter comprising a casing having a metering chamber formed therein, coöperative pistons disposed within the metering chamber and having pistons dividing said metering chamber into four metering compartments, said pistons being adapted to be operated by fluid admitted to said metering compartments in succession, an inlet chamber above the metering chamber, an inlet compartment disposed above each metering compartment and intermediate the metering chamber and the inlet chamber, a discharge chamber beneath the metering chamber, a discharge compartment for each metering compartment and disposed intermediate the metering chamber and the discharge chamber, said inlet and discharge compartments being in constant communication with the metering compartments, a rotary inlet valve adapted to form a communication between the inlet chamber and the inlet compartments in succession, a rotary valve adapted to form a communication between the discharge compartments and the discharge chamber in succession, an operative connection between said pistons and said valves whereby they will operate in synchronism, and a registering mechanism operated by said slides.

8. A liquid meter comprising a casing having a metering chamber formed therein, an inlet chamber at one end of the metering chamber, a discharge chamber at the other end of the metering chamber, cooperating pistons within the metering chamber dividing the metering chamber into a plurality of metering compartments, a rotatable inlet valve interposed between the metering chamber and the inlet chamber and adapted to successively admit fluid to said compartments from the inlet chamber, a rotary discharge valve below the metering chamber and adapted to successively permit the discharge of fluid from said metering compartments to said discharge chamber, and an operative connection between said pistons and said valves whereby they will operate in synchronism, and registering means driven by said pistons to indicate the volume of liquid displaced thereby.

9. A liquid meter comprising a casing having a metering chamber formed therein, an inlet chamber at one end of the metering chamber, a discharge chamber at the other end of the metering chamber, cooperating pistons within the metering chamber dividing the metering chamber into a plurality of metering compartments, a rotatable inlet valve interposed between the metering chamber and the inlet chamber and adapted to successively admit fluid to said compartments from the inlet chamber, a rotary discharge valve intermediate the metering chamber and the discharge chamber and adapted to successively permit the discharge of fluid from said metering compartments to said discharge chamber, and an operative connection between said pistons and said valves whereby they will operate in synchronism, and registering means driven by said pistons to indicate the volume of liquid displaced thereby, and means for varying the stroke of said pistons to change the ratio between them and the registering mechanism.

ALBERT J. GRANBERG.